United States Patent [19]

Laakmann et al.

[11] Patent Number: 5,071,222

[45] Date of Patent: Dec. 10, 1991

[54] LIGHTPIPE TIP FOR CONTACT LASER SURGERY

[75] Inventors: Katherine D. Laakmann, Seattle; Michael B. Levy, Woodinville, both of Wash.

[73] Assignee: Luxar Corporation, Bothell, Wash.

[21] Appl. No.: 513,666

[22] Filed: Apr. 24, 1990

Related U.S. Application Data

[63] Continuation-in-part of Ser. No. 310,774, Mar. 17, 1989, Pat. No. 5,005,944, which is a continuation-in-part of Ser. No. 139,285, Dec. 29, 1987, Pat. No. 4,805,987.

[51] Int. Cl.$^5$ ............................................. G02B 6/20
[52] U.S. Cl. .................................... 385/125; 372/701; 606/28; 385/134
[58] Field of Search ..................... 350/96.30, 96.32; 372/108, 701; 606/27, 28, 29

[56] References Cited

U.S. PATENT DOCUMENTS

| | | | |
|---|---|---|---|
| 3,382,087 | 5/1968 | Ostrowski | 117/35 |
| 3,436,141 | 4/1969 | Comte | 350/96 |
| 4,068,920 | 1/1978 | Bass et al. | 350/96 |
| 4,194,808 | 3/1980 | Marhic et al. | 350/96.32 |
| 4,453,803 | 6/1984 | Hidaka et al. | 350/96.32 |
| 4,583,539 | 4/1986 | Karlin et al. | 350/96.32 |
| 4,592,353 | 6/1986 | Daikuzono | 128/303.1 |
| 4,652,083 | 3/1987 | Laakmann | 350/96.32 |
| 4,662,368 | 5/1987 | Hussein et al. | 128/303.1 |
| 4,688,892 | 8/1987 | Laakmann | 350/96.32 |
| 4,688,893 | 8/1987 | Laakmann | 350/96.32 |
| 4,693,244 | 9/1987 | Daikuzono | 128/303.1 |
| 4,736,743 | 4/1988 | Daikuzono | 128/303.1 |
| 4,773,413 | 9/1986 | Hussein et al. | 128/303.1 |
| 4,800,568 | 1/1989 | Krueger et al. | 372/108 |
| 4,805,987 | 2/1989 | Laakmann | 350/96.32 |
| 4,806,289 | 2/1989 | Laursen et al. | 350/96.32 |
| 4,899,741 | 2/1990 | Bentley et al. | 606/27 |
| 4,913,505 | 4/1990 | Levy | 350/96.10 |

FOREIGN PATENT DOCUMENTS

| | | |
|---|---|---|
| 2352670 | 4/1975 | Fed. Rep. of Germany . |
| 58-4103 | 1/1983 | Japan ................. 372/701 |

OTHER PUBLICATIONS

Jenkins, Richard Michael and Devereux, Robert W. J., "Dispersion Phenomena in Hollow Aluminum Waveguides", *IEEE Journal of Quantum ELectronics*, QE-21, 10:1722-1727, Oct. 1985.

Bornstein, A. and Croitoru, N., "Experimental Evaluation of a Hollow Glass Fiber", *Applied Optics*, 25:355-358, Feb. 1986.

*Primary Examiner*—William L. Sikes
*Assistant Examiner*—Robert E. Wise
*Attorney, Agent, or Firm*—Seed and Berry

[57] ABSTRACT

A contact laser surgery tip for connection to a lightpipe conducting laser light. A hollow proximal end portion of the tip connects to the lightpipe. A hollow distal end portion is heated when it absorbs at least a portion of the laser light transmitted thereto by the proximal end portion. The proximal end portion of the tip is fabricated with an inner surface material having an index of refraction with a real part that is less than about 0.3. The surface material is coated with a reflectivity-enhancing thin film. The proximal end portion of the tip can include a sleeve on which is deposited the highly reflective inner surface material with the thin film coating. The tip is shaped and given material characteristics so that the distal end and proximal end portions can be selectively heated. The tip can include apertures for allowing the passage of a selected portion of laser light outwardly from the tip.

31 Claims, 3 Drawing Sheets

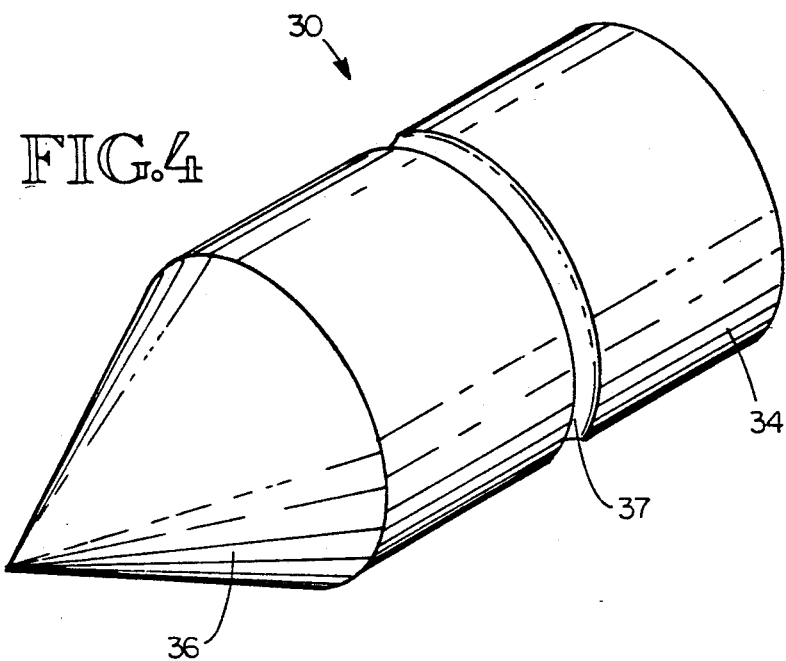
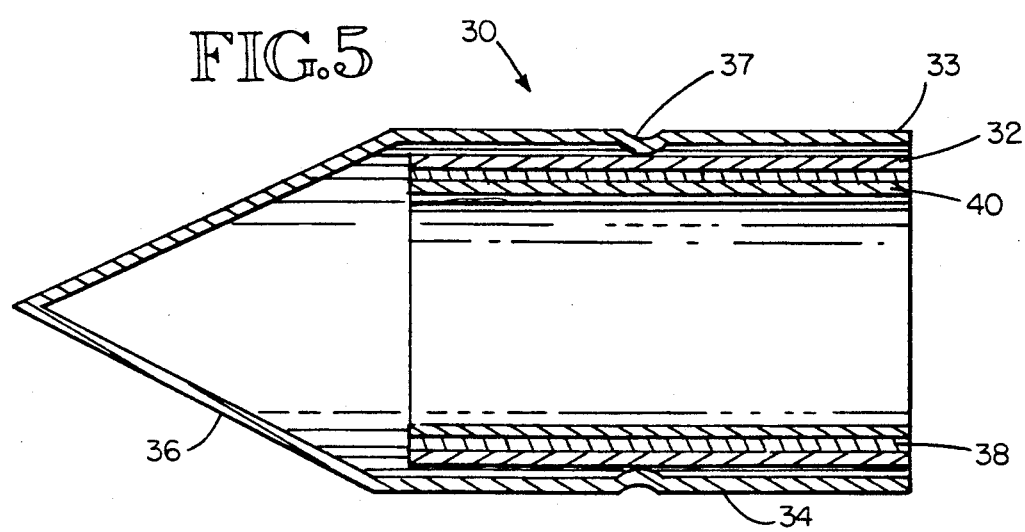

LIGHTPIPE TIP FOR CONTACT LASER SURGERY

CROSS-REFERENCE TO RELATED APPLICATION

This is a continuation-in-part of U.S. Pat. applic. Ser. No. 310,774, filed 3/17/89 now U.S. Pat. No. 5,005,944, filed Feb. 17, 1989 which is a continuation-in-part of U.S. Pat. application No. 139,285, filed Dec. 29, 1987, now U.S. Pat. No. 4,805,987.

1. Technical Field

This invention relates to laser lightpipe tips, and more particularly, to laser lightpipe tips for contact laser surgery.

2. Background Art

Presently available surgical yttrium aluminum garnet (YAG) lasers, having a wavelength of approximately 1.06 micrometers, are frequently attached to an optical fiber or other optical conduit for transmitting the YAG laser energy. The penetration depth of 1.06 micrometer radiation in non-vascular tissue is several millimeters. As a result of the long penetration depth and the high scattering coefficient of the YAG laser energy into tissue, the YAG laser beam does not ablate or excise tissue efficiently. The optical fiber can be supplied with an artificial sapphire tip end to achieve a variety of effects, including (1) greater concentration of power to enhance incision, and (2) heating of the tip to achieve coagulation and cutting.

The artificial sapphire tip, when used in contact with tissue, improves the excision and ablation properties of the YAG laser by 1) converting the YAG laser energy into heat at the interface between the tip and tissue and 2) by further concentrating the YAG laser energy to a more focused spot than that achievable by a bare fiber. It is the former property that is mostly responsible for achieving the clinical effects (i.e., the excision and ablation properties) of the artificial sapphire tips. The artificial sapphire tips, however, suffer from several notable deficiencies. Among them are their high cost, excessive fragility and variable (non-controllable) clinical effects.

Artificial sapphire tips are very expensive, costing between $300 and $400 per tip. The tips are almost too costly to be considered a disposable item. It is not uncommon to have an artificial sapphire tip last less than one clinical procedure. Not only does this further increase the cost associated with usage, but a certain amount of clinical risk arises from the possibility of some fragments not being removed from the body.

Finally, artificial sapphire tips do not always perform in a predictable way. Artificial sapphire itself does not absorb much of the YAG laser energy, hence, in the beginning of a procedure, it is not uncommon for it to cut poorly. The tip does not become an effective cutting tool until a layer of carbon an other debris coat the outer surface of the sapphire tip. To remedy this situation, some manufacturers have coated the sapphire tip with a highly absorbing layer. This solution has not been entirely satisfactory, partially because the coating layer might tend to flake or burn during use.

It is therefore desirable to utilize hollow tips for the reasons noted previously, and to alleviate the shortcomings of artificial sapphire tips and other currently known state-of-the-art tips.

SUMMARY OF THE INVENTION

The present invention resides in a tip for contact surgery. The tip includes a housing with a hollow light waveguide proximal end portion and a hollow light waveguide distal end portion. The proximal end portion efficiently transmits laser light applied thereto from the end of a light conduit. The distal end portion has a selected size and shape which absorbs at least some of the laser light transmitted thereto and heats up upon the application of the laser light to a sufficient temperature to perform surgery. The tip housing is fabricated from a material having a thermal conductance less than about $10^{-3}$ watts/°C. In one preferred embodiment, the housing is fabricated from stainless steel. The distal end portion is formed with one of a conical, round, or chisel shape. In a preferred embodiment, the distal end portion has at least one aperture to transmit therethrough and outwardly from the tip a selected portion of the laser light received from the proximal end portion.

The proximal end portion has an inner surface made from a material having an index of refraction with a real part that is less than 0.3. The inner surface may be chosen from the group of materials consisting of silver, gold, and copper. The inner surface of the proximal end portion may be coated with a reflectivity-enhancing thin film or a protective film to prohibit oxidation of the metal surface. The refractive index of the reflectivity enhancing thin film has a real part that is less than 1.6 and an imaginary part that is less than 0.001. The thin film is chosen from the group of materials consisting of $SiO_2$, $MgF_2$, and $ThF_4$.

In another preferred embodiment of the invention, the proximal end portion has an inner sleeve positioned coaxially therein. The inner surface of the sleeve has a reflectivity that is greater than 97% for laser light which is incident thereon at angles of incidence greater than 80 degrees. Preferably, the sleeve has an inner surface made from a material having an index of refraction with a real part that is less than 0.3. The sleeve inner surface material is chosen from the group of materials consisting of silver, gold, and copper. In this embodiment, the sleeve inner surface may be coated with a reflectivity-enhancing thin film. The refractive index of the thin film has a real part that is less than 1.6 and an imaginary part that is less than 0.001. The thin film is chosen from the group of materials consisting of $SiO_2$, $MgF_2$, and $ThF_4$.

Other features and advantages of the invention will become apparent from the following detailed description taken in conjunction with the accompanying drawings.

BRIEF DESCRIPTION OF THE DRAWINGS

FIG. 4 is an isometric view showing a second embodiment of the optical conduit tip of the present invention.

FIG. 5 is a side elevational, sectional view of the optical conduit tip of FIG. 4 with the inner layers and inner sleeve shown with enlarged thickness for purposes of illustration.

BEST MODES FOR CARRYING OUT THE INVENTION

The applicants have recognized that a section of hollow tube having a highly reflective inner surface can serve as a high efficiency hollow tip for use at the distal end of a YAG fiber or other light conduit. Such tips are less fragile than the artificial sapphire tips presently used with YAG fibers and are less expensive. Several metals are known to have low refractive indices at 1.06 micrometers. For example, silver has a refractive index of roughly 0.13–6.83j in thin film and 01.28–7.0j in bulk at 1.06 micrometers, while copper has an index of 0.2–7.0j in both bulk and thin film. The computed reflectivities of these materials are greater than 98% averaged for P and S polarization at an 81 degrees angle of incidence. The anticipated transmission for tips of these materials is generally greater than 90%, dependent upon the exact tip geometry and the input laser beam.

The transmission efficiency of the light through such a tip is dependent upon the index of refraction of the material that composes the highly reflective layer formed on the tube's inner wall. The index of refraction is a complex number whose real and imaginary components are dependent upon the wavelength and polarization of the incident light. The light polarization is determined by whether the electric field (E-field) vector is parallel to the light's plane of incidence (P-polarized) or perpendicular to the light's plane of incidence (S-polarized).

It has been determined that the highly reflective layer is preferably made from a material having a low index of refractivity. The material in the highly reflective layer should also be chosen for its safety and ease of manufacturing.

Figure 1:
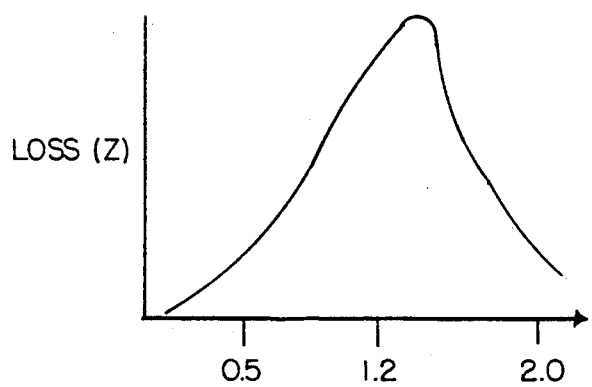
FIG. 1 is a graph of transmission loss as a function of the imaginary component of the complex index of refraction.

In general, the highly reflective layer should have a complex index of refraction with a real part that is relatively small and a thickness that is unimportant as long as it is thick enough to assure that the reflective layer has bulk absorption properties It has been found that, for values of n which are sufficiently low, acceptably low losses are obtained when the imaginary part of the index of refraction has a value outside of a specific range. As shown in the graph of FIG. 1, for values of n of less than approximately 0.2 and for a fixed angle of incidence, transmission loss is maximum when the imaginary component has a value of approximately 1.2. In order to keep the transmission loss acceptably low, therefore, it is desirable to maintain k with a value that is less than approximately 0.5 or greater than approximately 2.0.

An extension of this concept is to enhance the reflectivity of the low index reflective inner layer by dielectrically overcoating it. At suitable thicknesses, a dielectric overlayer can be used to protect the metal from oxidizing. For example, a layer of $SiO_2$ of less than 500 angstroms would serve as a suitable protective layer and not significantly change the transmission efficiency of the reflective layer. On the other hand, a 1200 angstrom layer of $SiO_2$ improves the reflectivity from 98% to 99.3% with silver.

The prior art includes the medical and surgical laser probes disclosed in U.S. Pat. Nos. 4,592,353; 4,693,244; and 4,736,743, to Norio Daikuzono. In various embodiments, these patents disclose light conduit tips made from a light transmissive material such as sapphire. These tips have the capability of controllably transmitting laser energy longitudinally through its distal end or transversely through its side. In addition, these tips can include a thin layer of infrared absorbing material such as manganese dioxide ($MnO_2$), which can receive optical energy transmitted through the side of the tip and transform this energy to thermal energy. The side of the tip, which can be heated to about 700° C., accordingly carbonizes any tissue it contacts. The remainder of the laser energy passes directly to the tissue, where it enhances the vaporization of the carbonized tissue. Non-contact laser systems utilizing a laser transmissive member at the output end of a fiber to focus or otherwise alter the radiation characteristics of the fiber have also been proposed, for example, by Enderly, in U.S. Pat. No. 4,273,109.

The tip of the present invention, however, while offering capability of both transmitting optical energy longitudinally through its distal end (into a conical distribution) and transforming some light energy into thermal energy for the purpose of carbonizing tissue, do so by transforming the thermal energy by means of the composition of an internal surface of the tip. The composition of the internal surface can be established by making the tip from an appropriate material exhibiting good absorption for the 1.06 μm wavelength (such as stainless steel) or by applying a coating as described above. The tips are, accordingly, more durable, since the inner surface, which converts the laser energy into thermal energy, is more protected than the outside surface of a fragile light transmissive material.

Both the amount of thermal energy distributed by the tip and the thermal profile along the tip can be controlled by the efficiency of conversion of light energy to thermal energy, the thermal characteristics of the material of which the tip is composed, and the contact between the tip and a thermal dissipation means such as an outer sheath. The optimum transmissivity, optimum temperature profile of the exterior of the tip, and optimum thermal time constant of the exterior of the tip will vary depending upon the exact clinical application for which the tip is intended. With some applications, it may be desirable to have just the most distal portions of the tip heat up, while with other applications, a longer portion of the tip should be heated. Included among the advantages of this invention over the prior art are that the heating profile, the thermal time constant, and the ultimate temperature of the tip can be readily tailored to a particular application.

Figure 2:
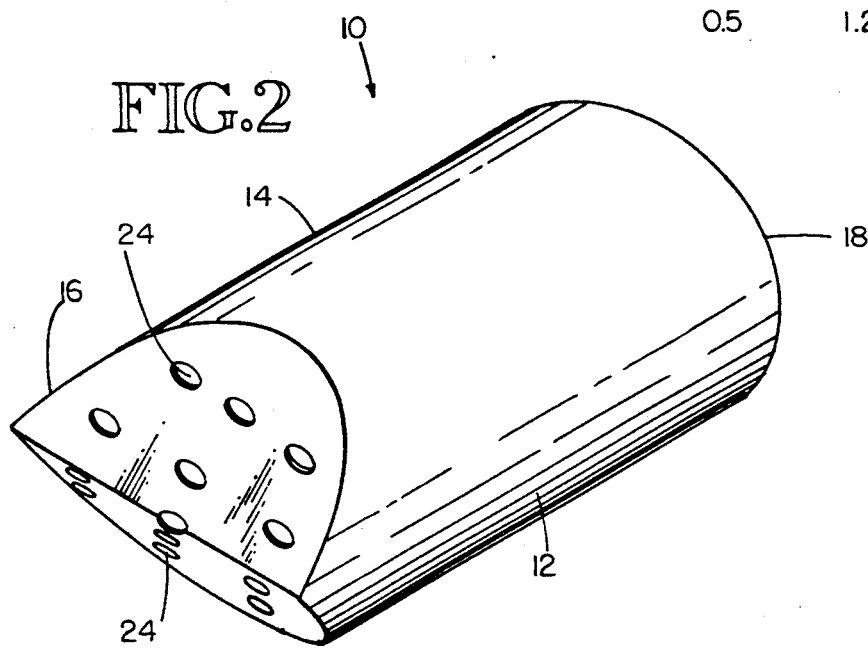
FIG. 2 is an isometric view showing a first embodiment of the optical conduit tip of the present invention.
Figure 3:
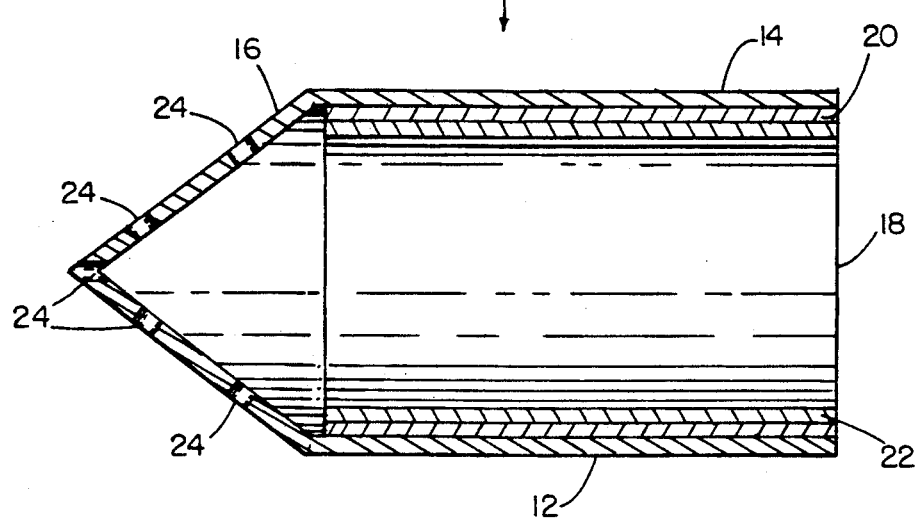
FIG. 3 is a side elevational, sectional view of the optical conduit tip of FIG. 2 with the inner layers shown with enlarged thickness for purposes of illustration.

FIG. 2 is an isometric view, and FIG. 3 is a longitudinal cross-section, showing a first embodiment of an optical conduit tip 10 of the present invention. The optical tip 10 includes a cylindrical housing 12 with a hollow light waveguide proximal end portion 14 for attachment to an optical fiber (not shown) and a hollow distal end portion 16. The distal end portion 16 can be formed with any desired shape and sized appropriately for the contact surgery to be performed, including the chisel shape shown in FIGS. 2 and 3. The proximal end portion 14 has an aperture 18 to receive laser light from the optical fiber to which connected, and an inner layer 20 for reflecting the laser light incident thereon after it passes through the aperture.

The inner layer 20 is made from a material having an index of refraction with a real part that is less than 0.3. This material can be chosen from the group of materials consisting of silver, gold, and copper. In addition, the inner layer 20 may be coated by a thin film layer 22 selected to enhance the reflectivity of the inner surface for laser light which is incident thereon at angles of incidence greater than 80 degrees, as measured from a normal to the inner layer 20 (i.e., the grazing angle). The thin film layer 22 can be a material chosen from the group of materials consisting of $SiO_2$, $MgF_2$, and $ThF_4$. The thin film layer 22 should have a reflective index that has a real part that is less than 1.6 and an imaginary part that is less than 0.001.

By selecting a high reflectivity material for the proximal end portion 14 and a lower reflectivity material for the distal end portion 16, and by selecting the thin film layer 22 used to coat the inner layer 20 of the proximal end portion, the temperature profile along the length of the tip 10 can be tailored to whatever profile is desired. In such fashion, the distal end portion 16, which contacts the tissue, may be heated as desired and the proximal end portion 14 may be kept cool.

Preferably, the tip 10 is constructed of all metal to achieve the benefits of increased resistance to thermal shock, easy and inexpensive fabrication, and selectable reflectivity, specific heat and thermal conductivity. By using a hollow tip, the wall thickness can also be selected to provide the thermal mass and hence thermal time constant desired for the tip.

A plurality of holes 24 may be provided in the distal end portion 16 to allow a selected fraction of the laser light transmitted into the distal end portion to leak out so as to achieve the desired operating characteristics for the tip 10. The holes 24 are sized to allow sufficient laser light energy to escape from the interior of the tip to facilitate coagulation or hemostasis in the body tissue contacted by the distal end portion during surgery.

A second embodiment of an optical conduit tip 30 is shown in an isometric view in FIG. 4 and in longitudinal cross-section in FIG. 5. In this embodiment, the tip 30 includes an inner sleeve 32 which lines a proximal end portion 34 of the tip and extends only part way toward a conical distal end portion 36. The sleeve 32 has an inner layer 38 possessing a reflectivity greater than 97% (average of the P and S polarization) for laser light which is incident thereon at angles of incidence greater than 80 degrees.

A contact laser surgery tip using the tips 10 and 30 of FIGS. 2-5 may be fabricated from thin-walled stainless steel. Stainless steel having a wall thickness of 0.004 inches has proven satisfactory. Stainless steel provides the advantage of low thermal conductivity as compared to other metals. By using a thin wall for the tip housing and a metal such as stainless steel having low thermal conductivity, the thermal conductance of the housing is minimized. As a result, the conductance of heat from the heated distal end portion of the tip, which may have some parts at 1800° F., to the proximal end portion may be controlled and reduced to an acceptable level. Since the thin film layer of dielectric material for enhancing reflection is deposited at the proximal end portion, it is desirable to maintain the proximal end portion at a temperature that will not cause the thin film layer to degrade and is preferably at 150° F. or less. Furthermore, it is also desirable to avoid heating the fiber to which the tip is attached. Substantial thermal isolation between a housing wall 33 and the inner sleeve 32 shown in FIG. 5 may be achieved with a small indentation 37 formed around the periphery of the housing which holds the sleeve spaced apart from the housing wall.

As with the proximal end portion of the embodiment of FIGS. 2 and 3, the inner layer 338 of the sleeve 32 used in FIG. 5 may be made from a material or coated with a material having an index of refraction with a real part that is less than 0.3, chosen from the group of materials consisting of silver, gold, and copper. In addition, the inner layer 38 may be coated by a thin film layer 40, chosen from the group of materials consisting of $SiO_2$, $MgF_2$, and $ThF_4$, and having a refractive index with a real part that is less than 1.6 and an imaginary part that is less than 0.001.

In the presently preferred embodiment, the sleeve 32 is fabricated from molybdenum with the inner layer 38 of the sleeve being a high-reflectivity silver with a reflectivity-enhancing overcoat layer 40 of $SiO_2$. Since the outer surface of the sleeve 32 is not in contact with the inner surface of the tip housing wall 33 along the full length of the sleeve, the sleeve has minimal contact with the stainless steel so as to minimize heat transfer from the housing wall 33 of the tip housing to the layers 38 and 40, thus preventing degradation of the coating on the inner surface of the sleeve. The use of molybdenum, which has a high melting point, is preferred for the sleeve 32 since even if a portion of the sleeve should get too hot, the entire sleeve will not disintegrate as might a stainless steel material. Of course, since the sleeve reflects the laser light and is coated with the reflection enhancing film layer 40, if excessive heat destroys the thin film layer or the sleeve itself, the performance of the tip 30 is seriously degraded.

The use of the sleeve 32 in the embodiment of FIGS. 4 and 5 also serves to facilitate construction of the tip 30. It is extremely difficult to deposit the thin film layer of reflection enhancing dielectric material directly on the inner surface of the tip housing as required with the embodiment of FIGS. 2 and 3. This difficulty is avoided by use of the sleeve 32. A flat or planar length of molybdenum foil material is first coated on one side with the layers 38 and 40 using a vacuum deposition technique. The flat foil material is then rolled or bent into the desired shape for the sleeve 32 with two of its opposite edges in abutment or overlapping, as desired. The rolled foil material is then inserted into the proximal end portion 34 of the tip 30 to form the sleeve 32, thus avoiding the need to deposit the thin film layer on the inside surface of an enclosed housing.

Figure 6:
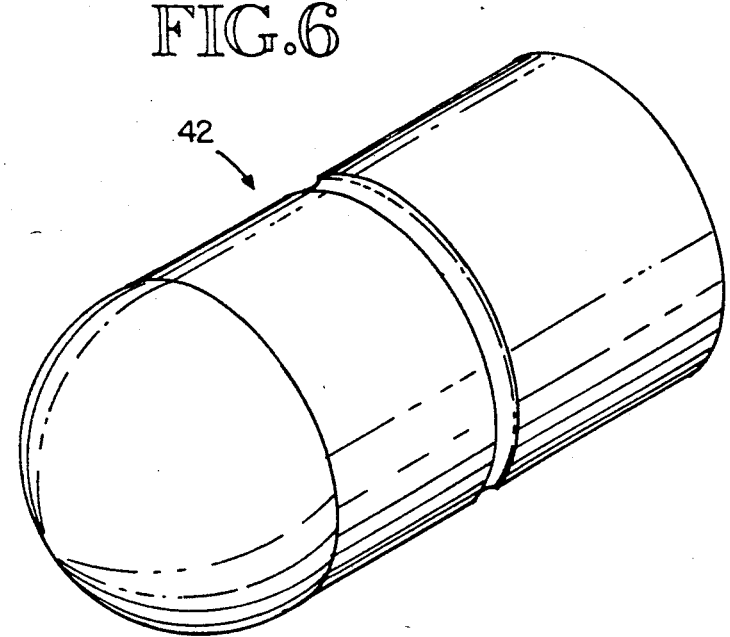
FIG. 6 is an isometric view showing a third embodiment of the optical conduit tip of the present invention.
Figure 7:
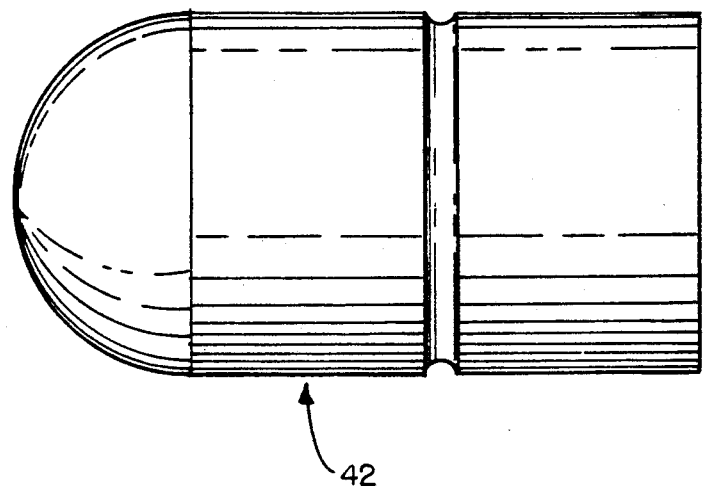
FIG. 7 is a side elevational view of the optical conduit tip of FIG. 6.

In the embodiment shown in FIGS. 4 and 5, the distal end portion 36 is conical. The distal portion 36 can be given any other appropriate shape needed for the use desired. Another example is the hemispherical or ball-shaped tip 42 shown in isometric view in FIG. 6 and elevational view in FIG. 7.

While the invention has been discussed in terms of specific embodiments, one skilled in the art will readily appreciate that various modifications of the above-described embodiments may be made without departing from the spirit and the scope of the invention. Accordingly, the present invention is to be limited only by the following claims.

We claim:

1. A tip for contact surgery, comprising a housing with a hollow light waveguide proximal end portion which efficiently transmits laser light applied thereto from the end of a light conduit, and a hollow light waveguide distal end portion of a selected size and shape which absorbs at least some of the laser light transmitted thereto and heats up upon the application of the laser light to an operating temperature at or above the temperature at which body tissue vaporizes.

2. The tip of claim 1 wherein the tip housing has a thermal conductance less than $2.5 \times 10^{-3}$ watts/°C.

3. The tip of claim 2 wherein the tip housing material is stainless steel.

4. The tip of claim 1 wherein the distal end portion is formed with one of a conical, hemispherical or chisel shape.

5. The tip of claim 1 wherein the distal end portion has at least one aperture to transmit therethrough and outwardly from the tip a selected portion of the laser light received from the proximal end portion, the aperture being sized to release sufficient laser light energy to facilitate coagulation or hemostasis in the body tissue contacted by the distal end portion during surgery.

6. The tip of claim 5 wherein at least one aperture includes a plurality of apertures distributed over the distal end portion.

7. The tip of claim 1 wherein the proximal end portion has an inner surface made from a material having an index of refraction with a real part that is less than 0.3.

8. The tip of claim 7 wherein the inner surface is chosen from the group of materials consisting of silver, gold, and copper.

9. The tip of claim 7 wherein the inner surface of the proximal end portion is coated with a reflectivity-enhancing thin film for laser light which is incident thereon at angles of incidences greater than 80 degrees.

10. The tip of claim 9 wherein the refractive index of the thin film has a real part that is less than 1.6 and an imaginary part that is less than 0.001.

11. The tip of claim 10 wherein the thin film is chosen from the group of materials consisting of $SiO_2$, $MgF_2$, and $ThF_4$.

12. The tip of claim wherein the proximal end portion has an inner sleeve positioned coaxially therein.

13. The tip of claim 12 wherein the inner surface of the sleeve has a reflectivity that is greater than 97% for laser light which is incident thereon at angles of incidence greater than 80 degrees.

14. The tip of claim 12 wherein the sleeve has an inner surface made from a material having an index of refraction with a real part that is less than 0.3.

15. The tip of claim 14 wherein the sleeve inner surface material is chosen from the group of materials consisting of silver gold, and copper.

16. The tip of claim 14 wherein the sleeve inner surface is coated with a reflectivity-enhancing thin film for laser light which is incident thereon at angles of incidence greater than 80 degrees.

17. The tip of claim 16 wherein the refractive index of the thin film has a real part that is less than 1.6 and an imaginary part that is less than 0.001.

18. The tip of claim 17 wherein the thin film is chosen from the group of materials consisting of $SiO_2$, $MgF_2$, and $ThF_4$.

19. The tip of claim 12 wherein the sleeve is fabricated from a foil material.

20. The tip of claim 19 wherein the sleeve foil material is molybdenum.

21. The tip of claim 12 wherein the sleeve only partially contacts an inner wall surface of the proximal end portion to reduce thermal conductivity therebetween.

22. A tip for contact surgery, comprising an all-metal housing with a hollow light waveguide proximal end portion which efficiently transmits laser light applied thereto from the end of a light conduit, and a hollow light waveguide distal end portion of a selected size and shape which absorbs at least some of the laser light transmitted thereto and heats up upon the application of the laser light to an operating temperature at or above the temperature at which body tissue vaporizes.

23. The tip of claim 22 wherein the proximal end portion has an inner surface made from a material having an index of refraction with a real part that is less than 0.3.

24. The tip of claim 23 wherein the inner surface of the proximal end portion is coated with a reflectivity-enhancing thin film for laser light which is incident thereon at angles of incidence greater than 80 degrees.

25. The tip of claim 22 wherein the proximal end portion has an inner sleeve positioned coaxially therein.

26. The tip of claim 25 wherein the inner surface of the sleeve has a reflectivity that is greater than 97% for laser light which is incident thereon at angles of incidence greater than 80 degrees.

27. The tip of claim 26 wherein the sleeve inner surface is coated with a reflectivity-enhancing thin film.

28. The tip of claim 25 wherein the sleeve is fabricated from a foil material.

29. The tip of claim 28 wherein the sleeve foil material is molybdenum.

30. The tip of claim 25 wherein the sleeve only partially contacts an inner wall surface of the proximal end potion to reduce thermal conductivity therebetween.

31. A method of manufacturing a hollow tip for contact surgery to receive laser light from the end of a light conduit, comprising the steps of:

(a) forming a hollow tip housing having an elongated interior space extending between an open first end to receive the laser light and a second end to be heated to an operating temperature at or above the temperature at which body tissue vaporizes;

(b) forming a planar sheet from a substrate material, said planar sheet having a first side and a second side;

(c) forming a reflection enhancing layer on said first side of said planar sheet;

(d) bending said planar sheet to form a sleeve with said first side defining an interior surface of said sleeve; and (e) inserting said sleeve into the open first end of said housing.

* * * * *

UNITED STATES PATENT AND TRADEMARK OFFICE
CERTIFICATE OF CORRECTION

PATENT NO. : 5,071,222

DATED : December 10, 1991

INVENTOR(S) : Katherine D. Laakmann et al.

It is certified that error appears in the above-identified patent and that said Letters Patent is hereby corrected as shown below:

In column 7, claim 12, line 41, after "claim" please insert -- 1 --.

Signed and Sealed this

Twenty-third Day of March, 1993

Attest:

STEPHEN G. KUNIN

*Attesting Officer*     Acting Commissioner of Patents and Trademarks